(12) United States Patent
Arjona

(10) Patent No.: US 9,290,143 B2
(45) Date of Patent: Mar. 22, 2016

(54) DEFLECTOR FOR A SKATEBOARD

(71) Applicant: Jorge A. Arjona, Chandler, AZ (US)

(72) Inventor: Jorge A. Arjona, Chandler, AZ (US)

(*) Notice: Subject to any disclaimer, the term of this patent is extended or adjusted under 35 U.S.C. 154(b) by 0 days.

(21) Appl. No.: 14/447,533

(22) Filed: Jul. 30, 2014

(65) Prior Publication Data

US 2016/0031396 A1   Feb. 4, 2016

(51) Int. Cl.
*B62D 25/16* (2006.01)
*B60R 19/54* (2006.01)
*A63C 17/26* (2006.01)
*A63C 17/01* (2006.01)

(52) U.S. Cl.
CPC .............. *B60R 19/54* (2013.01); *A63C 17/012* (2013.01); *A63C 17/015* (2013.01); *A63C 17/26* (2013.01)

(58) Field of Classification Search
CPC .... A63C 17/01; A63C 17/011; A63C 17/012; A63C 17/015; A63C 17/26; B62J 99/00
USPC ....................... 280/87.041, 87.042
See application file for complete search history.

(56) References Cited

U.S. PATENT DOCUMENTS

| 7,699,323 | B2* | 4/2010 | Taylor | 280/14.21 |
|---|---|---|---|---|
| 8,720,917 | B1* | 5/2014 | Gair | 280/87.042 |
| 2002/0167147 | A1* | 11/2002 | Muehlhauser | 280/87.041 |
| 2006/0145444 | A1* | 7/2006 | Garland | 280/87.042 |
| 2006/0192357 | A1* | 8/2006 | Lin | 280/87.042 |
| 2008/0197616 | A1* | 8/2008 | Finstad | 280/770 |
| 2009/0236811 | A1* | 9/2009 | Lewis | 280/87.042 |

* cited by examiner

*Primary Examiner* — Brodie Follman
*Assistant Examiner* — Brian Cassidy
(74) *Attorney, Agent, or Firm* — Iussa Law, PLLC

(57) ABSTRACT

A deflector for a skateboard generally comprises; a sweep plate to deflect in-path debris from the skateboard's line of travel and a sweep plate suspension, which is coupled to the sweep plate and to the skateboard. The sweep plate suspension provides to substantially maintain a sweep plate's position proximate to a ground in response to maneuverings of the skateboard. The sweep plate suspension may further comprise a spring to provide for a flexing of the sweep plate in response to the maneuverings so as to maintain the sweep plate's proximate position. The sweep plate suspension may couple to a truck or a platform of the skateboard, and may also comprise an adjustment mechanism to set the sweep plate's position. The sweep plate may be releasable from the sweep plate suspension, and at least one of the sweep plate and the sweep plate suspension may comprise lights.

18 Claims, 6 Drawing Sheets

DEFLECTOR FOR A SKATEBOARD

BACKGROUND OF THE INVENTION

Skateboards, roller skates, scooters, wagons, tricycles, bicycles and various other wheeled entertainment and/or transport vehicular type items are very popular in today's culture. They have evolved from very basic embodiments to somewhat extreme and complex machinery. However, whether simple or complex, they inherently suffer from one major environmental drawback; in-path obstructions. For example, and particularly with regard to skateboards, obstructions such as rocks, sand, twigs, and the like, when interfering with the wheels of the skateboard can cause the skateboard to come to an abrupt halt. Such an abrupt halt almost always results in throwing the user from the skateboard, re-directing the user, damaging the skateboard, and even causing injury from a fall. Often, a user may be operating their skateboard at a relatively great speed, thereby exacerbating any injuries and/or damage, and diminishing the entertainment and/or transport value.

Technologies exist that seek operate to overcome the above mentioned environmental hazards, but they significantly lack the ability to accommodate the particular use of a particular vehicle. For example, with regard to a skateboard, a skateboard user relies on the ability to lean the platform of the skateboard so as to cause the respective suspension to pivot, and turn the skateboard. Similarly, skateboard users often use their skateboard to perform various stunts or tricks, wherein such stunts or tricks are conducted by manipulating the skateboard not only from side to side, as in turning, but aft and forward as well. Skateboard users also perform various flips and slides. Thus, any deflection device for a skateboard must be able to operate as intended to deflect in-path obstructions but also not detract from the user's ability to ride the skateboard and/or perform stunts and tricks. What is needed, and disclosed, are systems and methods that deflect in-path environmental hazards for a wheeled vehicle, such as a skateboard, without limiting the user from riding the skateboard and/or performing stunts and/or tricks.

SUMMARY OF THE INVENTION

Among various representative embodiments, a deflector for a skateboard to clear in-path debris generally comprises a sweep plate to deflect in-path debris from the skateboard's line of travel, and a sweep plate suspension coupled to the sweep plate and to the skateboard. The sweep plate suspension provides to substantially maintain a sweep plate's position proximate to a ground in response to maneuverings of the skateboard. The deflector for the skateboard generally comprises a width that extends at least across a wheelbase of the skateboard.

Among various representative embodiments, the sweep plate suspension may comprise a spring to provide for a flexing of the sweep plate in response to the maneuverings, wherein the spring may comprise at least one of a coil spring, torsion spring, leaf spring, compression spring, tension spring, clock spring, and the like. Among various representative embodiments, the deflector for a skateboard may couple to a truck of the skateboard, but in other embodiments the deflector may couple to a platform of the skateboard.

Among various representative embodiments, the deflector for a skateboard may comprise a configuration wherein the sweep plate is releasable from the sweep plate suspension. Moreover, the deflector for a skateboard may comprise an adjustment mechanism to set the sweep plate's position, such as height from the ground. Various representative embodiments may also comprise at least one of the sweep plate and the sweep plate suspension to comprise lights and/or other decorative and/or functional elements.

According to a representative embodiment, a skateboard may comprise a platform to support a user of the skateboard, wherein the skateboard comprises a first set of wheel trucks coupled to a first end of the skateboard and a second set of wheel trucks coupled to a second end of the skateboard. The skateboard may further comprise a first deflector to clear in-path debris of the skateboard during travel, wherein the first deflector couples to the first set of wheel trucks, and the skateboard may further comprise a second deflector to clear the in-path debris of the skateboard during travel, wherein the second deflector couples to the second set of wheel trucks. The first and/or second deflectors may flex to maintain at least one of the first and/or second deflectors in a position proximate to a ground.

Among various representative embodiments, a deflector for a skateboard may comprise a method for manufacturing, packaging, marketing, distributing, and/or selling the deflector for a skateboard.

BRIEF DESCRIPTION OF THE DRAWINGS

A more complete understanding of a deflector for a skateboard may be derived by referring to the following detailed description and appended claims when considered in connection with the following illustrative Figs. In the following Figs., like reference numbers refer to similar elements and steps throughout the Figs.

Elements and/or any steps in the Figs. are illustrated for simplicity and clarity and have not necessarily been rendered according to any particular assembly and/or sequence of operation. For example, method steps may be performed concurrently or in different order are illustrated in the Figs. to help improve an understanding of exemplary embodiments of a deflector for a skateboard. Similarly, illustrated components may be assembled and/or constructed in various configurations using shown or comparable elements to help also improve an understanding of exemplary embodiments of a deflector for a skateboard.

DETAILED DESCRIPTION OF THE INVENTION

A deflector for a skateboard may be described herein by terms of various functional system elements and various method steps. Such functional elements may be realized by any number of hardware components configured to perform specified functions and achieve various results. For example, a deflector for a skateboard may employ and/or engage various skateboard components, e.g., trucks, wheels, footboards, suspensions, and the like, which may carry out a variety of functions. In addition, a deflector for a skateboard may be practiced in conjunction with any variety of skateboard and skateboard type applications, whether for sport, entertainment, and/or toy purpose, and any systems described are merely exemplary applications. A deflector for a skateboard described and claimed herein, may be applied to other wheeled vehicles also, such as, roller skates, scooters, wagons, tricycles, bicycles, and the like. Further, a deflector for a skateboard may employ any number of conventional techniques for manufacturing, packaging, marketing, distributing, and/or selling the deflector for a skateboard.

Figure 1:
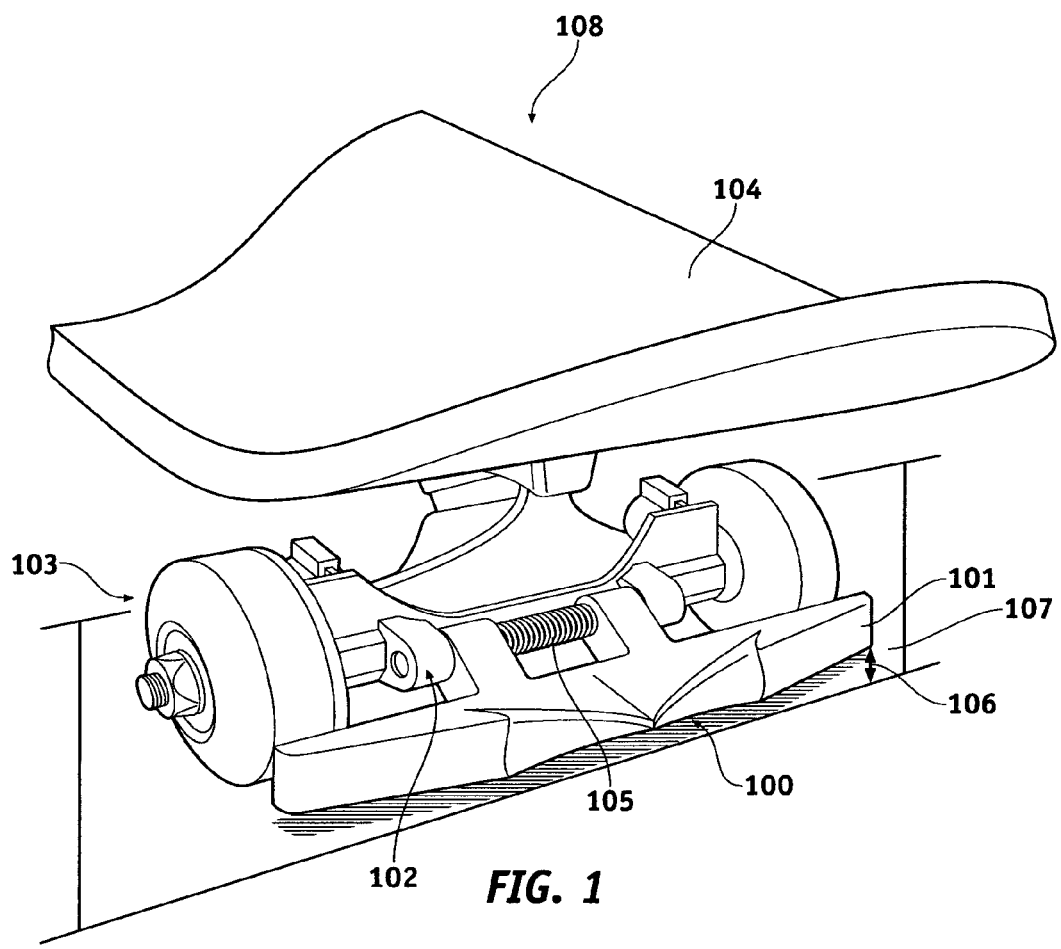
FIG. 1 representatively illustrates an exemplary embodiment of a deflector coupled to a skateboard.

Various representative implementations of a deflector for a skateboard may be applied to any skateboard system. Referring now to FIG. 1, a deflector for a skateboard system 100 may comprise a sweep plate 101 coupled to a sweep plate suspension 102. In a preferred embodiment, sweep plate suspension 102 may be coupled to a set of skateboard trucks 103, wherein skateboard trucks 103 may be coupled to a skateboard platform 104. Among various representative embodiments, sweep plate suspension 102 may comprise a mechanism, in this instance spring 105, that provides for sweep plate 101 to flex so as to maintain a sweep plate's position, for example sweep plate height 106, proximate to a ground 107 in response to maneuverings of a skateboard 108, for example by a user riding skateboard 108. In this manner as the user operates skateboard 108, sweep plate 101 deflects any in-path debris from the skateboard's line of travel, i.e., prevents any in-path debris from interfering with the wheels of skateboard 108, wherein such interference invariably causes skateboard 108 to abruptly halt, veer direction, careen, etc., which could throw the user from the skateboard and cause injury and/or damage. As can be seen by FIG. 1, sweep plate 101 coupled to spring 105 of sweep plate suspension 102 allows sweep plate 101 to flex up and down depending on the operation of skateboard 108 by the user, and the flexing, facilitated by spring 105, provides for sweep plate 101 to maintain a relative proximate position to ground 107. Those skilled in the art will understand that to maintain a relative proximate position to ground 107 means that sweep plate 101 comprises an initial set height, for example sweep plate height 106, and as the user tilts skateboard 108 during use, ground 107 pushes upon sweep plate 101 thereby causing it to flex upwardly via spring 105 of sweep plate suspension 102. When the user returns skateboard 108 back to its level riding position, spring 108 causes sweep plate 101 to return to its original sweep plate height 106.

Figure 2:
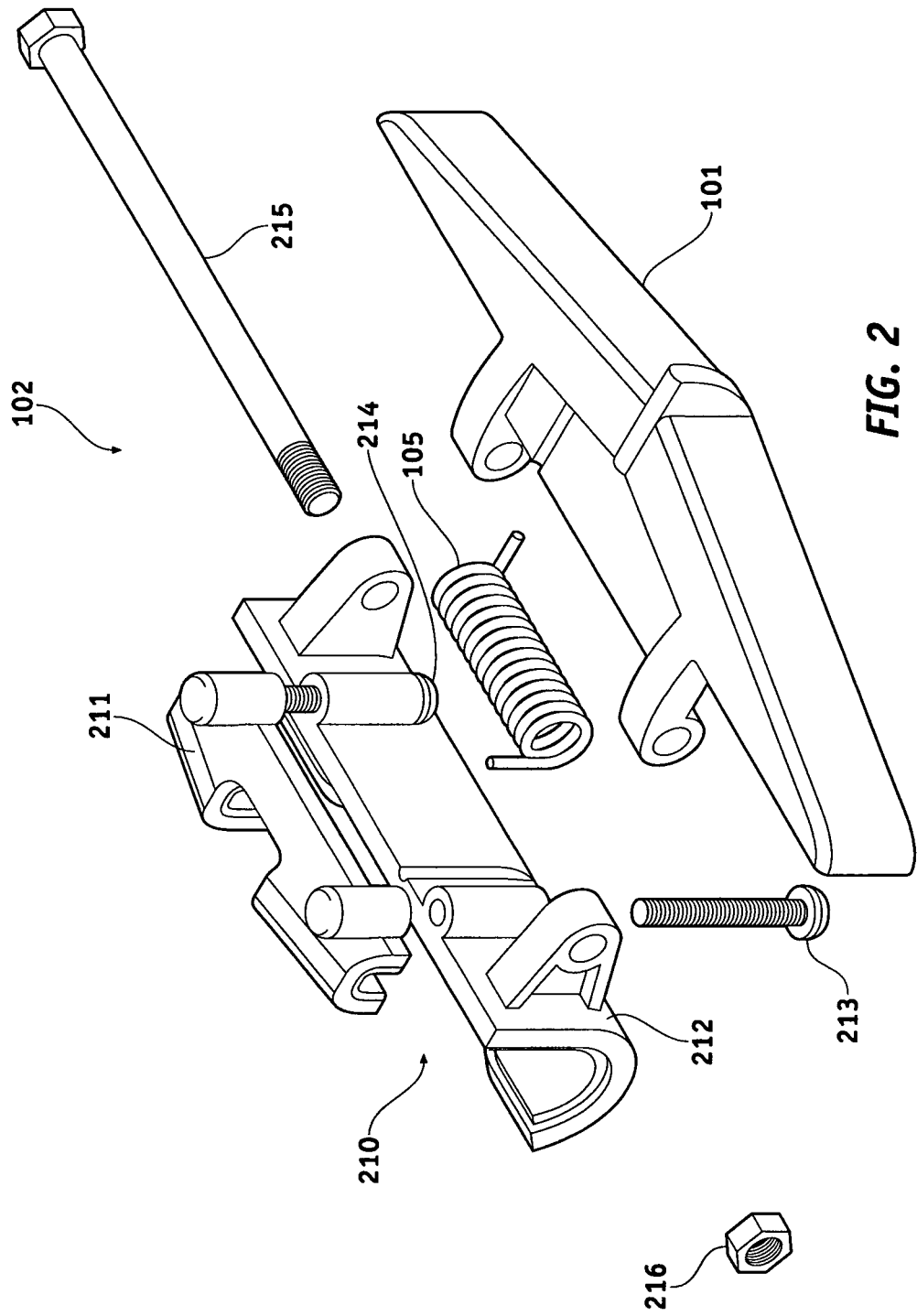
FIG. 2 representatively illustrates an exploded view of the deflector.

Turning now to FIG. 2, which shows an exploded view of sweep plate 101 and sweep plate suspension 102, among various exemplary embodiments, sweep plate suspension 102 may comprise a truck mounting bracket 210 comprising an upper truck mounting portion 211 and a lower truck mounting portion 212. As can be seen and will be understood by those skilled in the art, upper truck mounting portion 211 and lower truck mounting portion 212 couple together about an axle/axle housing portion of a skateboard truck, not shown, by securing screws, such as securing screws 213 and 214. In this preferred embodiment, sweep plate 101 and spring 105 may then be coupled to mounting portions 211 and/or 212 via through bolt 215 and secured using bolt nut 216.

Clearly those skilled in the art will understand that the preferred embodiment shown and described is merely one exemplary embodiment and various other configurations may be used to carry out the function of clearing in-path debris for a skateboard by a skateboard user. For example, and discussed further below, various suspensions comprising various brackets, springs, bolts, screws and the like may be employed. As an example, various other springs, such as coil springs, torsion springs, leaf springs, compression springs, tension springs, clock springs, etc may be used, and an exemplary deflector embodiment may comprise any number and/or type of spring.

Figure 3:
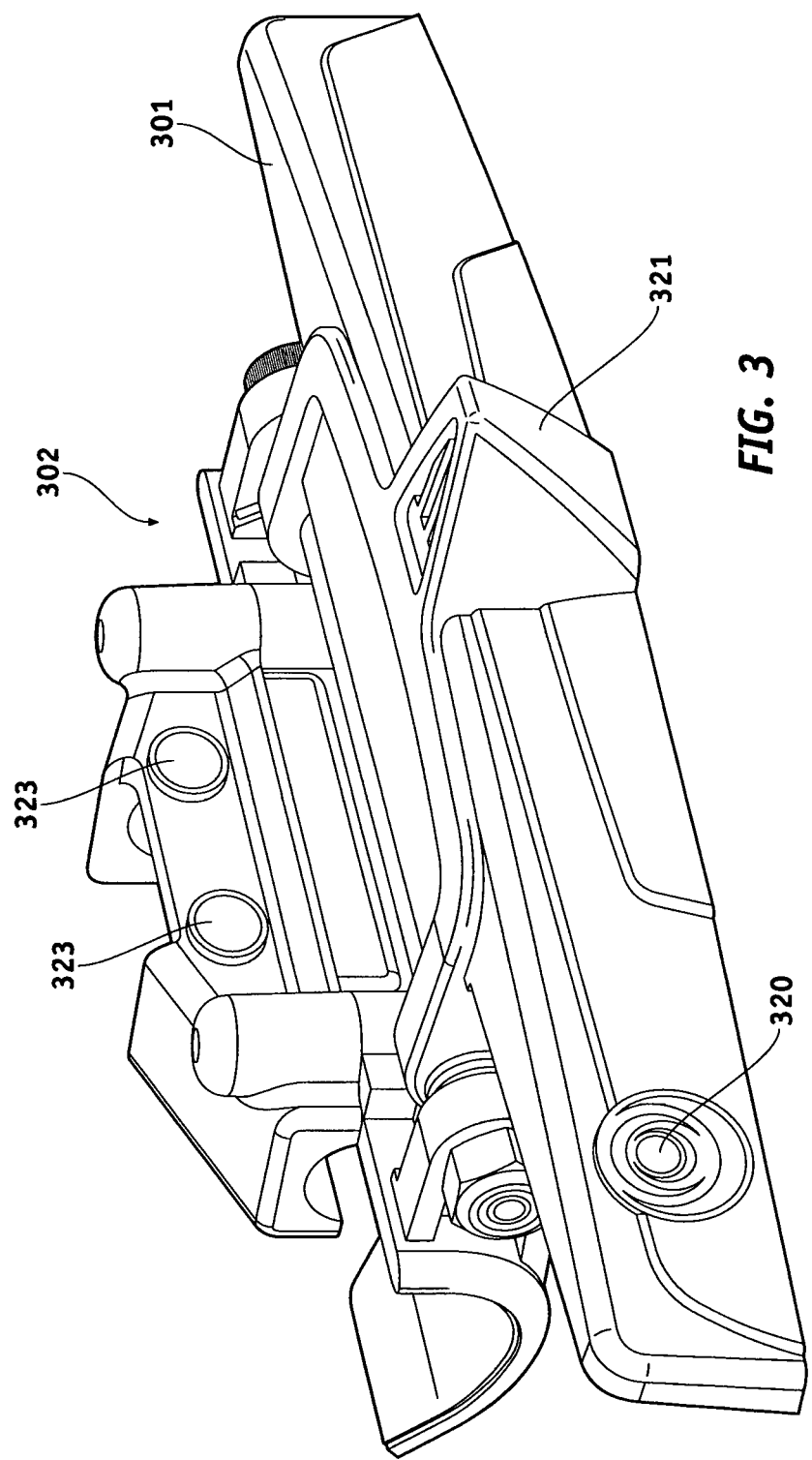
FIG. 3 representatively illustrates an exemplary embodiment of an alternate configuration of a deflector sweep plate and various decorative elements.

With regard to sweep plates, various other sweep plate configurations may be employed. For example, a single sweep plate extending across the front of the skateboard by a dimension at least as wide as the skateboard wheel base, as shown in FIGS. 1 and 2, may be replaced by independent sweep plates positioned in front of each wheel; i.e., leaving a center portion clear of a sweep plate and only providing deflection across the width of each respective wheel. It will be further appreciated by those skilled in the art that the sweep plate itself may comprise various geometric configurations to facilitate deflecting in-path debris and/or for aesthetic purposes. For example, the sweep plate may comprise various deflection angles, both laterally and longitudinally. The sweep plate may also be beveled at a front portion to provide a "scooping" motion of any in-path debris or it may comprise a flatter, planar configuration to provide for a more "plowing" motion of any in-path debris; or any combination thereof. For example, FIGS. 1 and 2 depict sweep plate 101 comprising a more beveled configuration, whereas with reference to FIG. 3, a sweep plate 301 comprises a more planar configuration. FIG. 3 also depicts various decorative elements that may be employed by a deflector. For example, sweep plate 301, as well as sweep plate 101, allows for decorative items to be affixed and/or integrated, such as emblem 320 and/or sweep plate nose 321. Similarly, sweep plate suspension 302, as well as sweep plate suspension 102, may also allow for decorative items to be affixed and/or integrated, such as lights 323. However, such decorative elements are not limited in this regard and various other decorative elements may be employed, and may be employed by either one or both of the sweep plate and the sweep plate suspension. Moreover, it will be further appreciated that while a sweep plate relies upon a flexing mechanism such as a spring, various other configurations may be employed to act as a flexing mechanism, i.e., to maintain the sweep plate's relative position to a ground. For example, a sweep plate may be coupled to a cylinder/piston system, a pneumatic system, a hydraulic system, and any other actuating mechanisms now known or developed in the future. Further a sweep plate, for some circumstances, may not flex at all, but rather comprise a fixed position. And still yet among other exemplary embodiments, a sweep plate may not couple to any flexing mechanism, but rather comprise the flexing mechanism to be directly integrated within the sweep plate.

Figure 4:
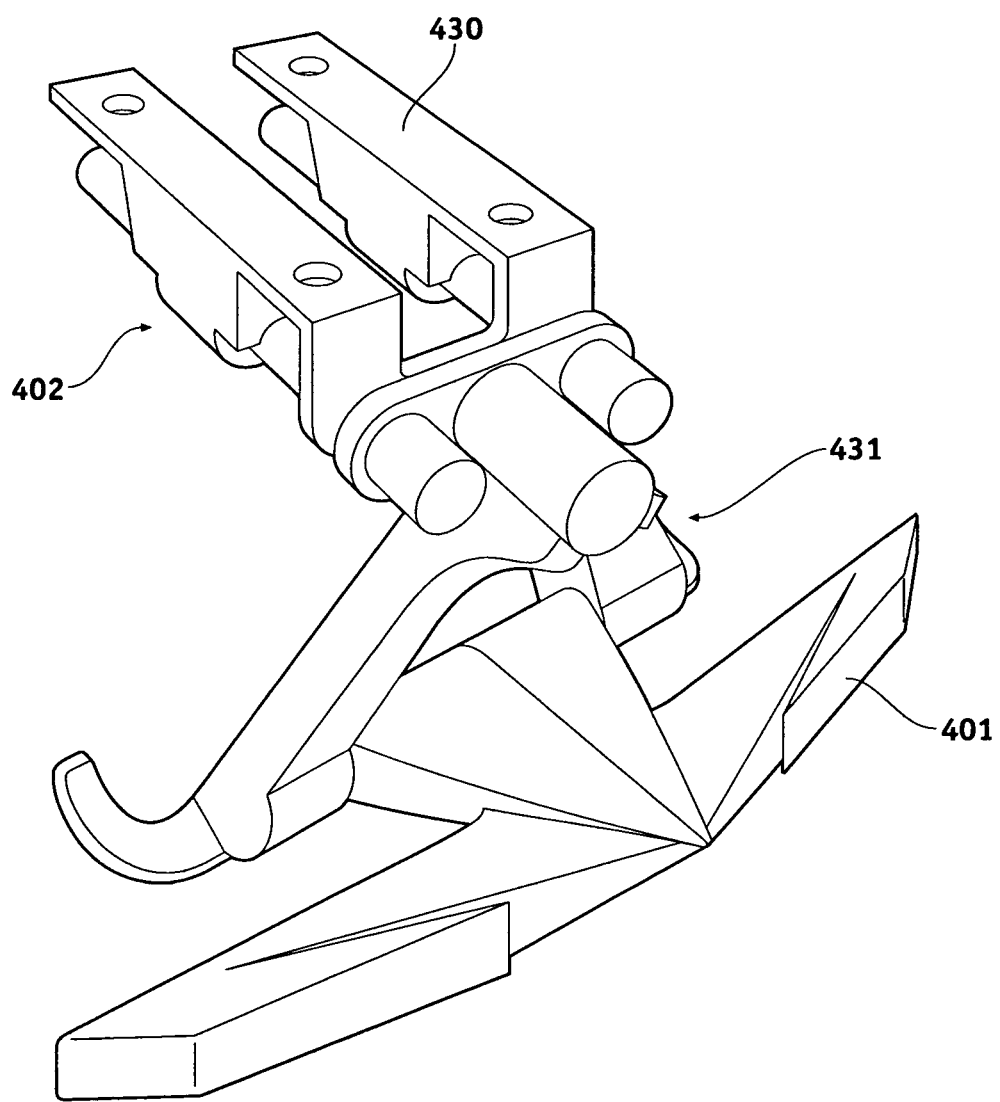
FIG. 4 representatively illustrates an exemplary embodiment of a deflector comprising an alternative sweep plate suspension configuration.
Figure 5:
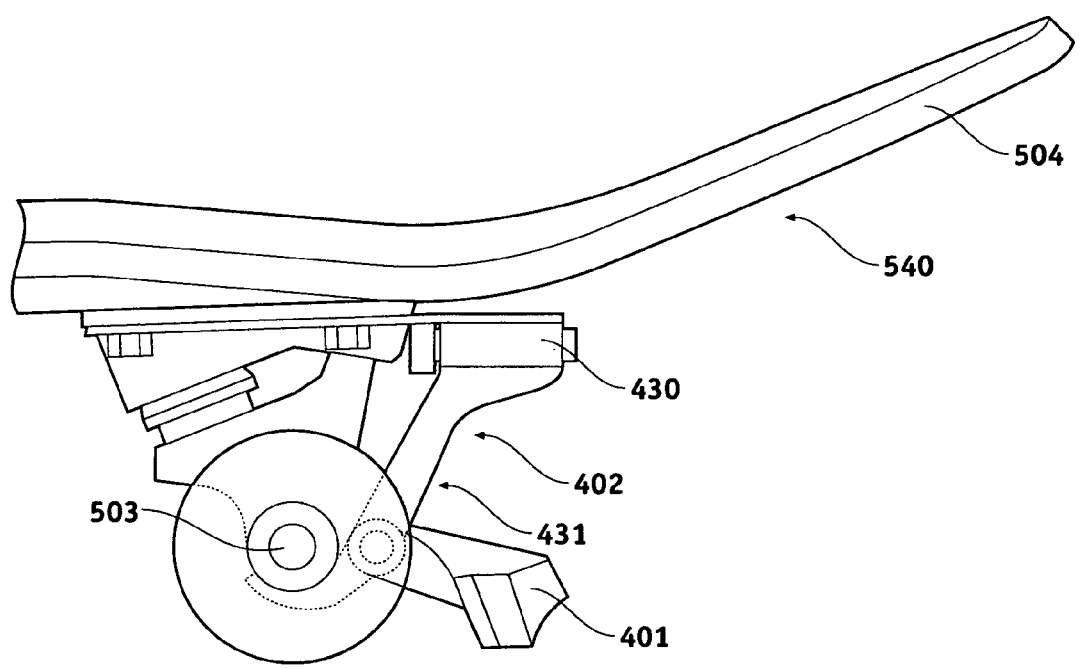
FIG. 5 representatively illustrates the alternative sweep plate suspension configuration coupled to a skateboard.

As mentioned previously, while various sweep plate configurations may be employed, so may various sweep plate suspension configurations be employed. It will further be appreciated by those skilled in the art that some configurations may not comprise a sweep plate suspension at all but rather provide for a only a sweep plate by itself that may be coupled to a truck and/or a platform of a skateboard. However in the spirit of full disclosure, other exemplary embodiments of a sweep plate suspension coupled to a sweep plate are disclosed. Turning now to FIG. 4, an alternate exemplary embodiment is depicted that shows a sweep plate suspension 402 coupled to a sweep plate 401. In this configuration, a platform bracket 430 provides for sweep plate suspension 402 to couple to an underside of a skateboard platform rather than directly to a truck of the skateboard, as in FIGS. 1 and 2. For example, and with momentary reference to FIG. 5, sweep plate suspension 402 is shown coupled to an underside 540 of a skateboard platform 504 via platform bracket 430. In this exemplary embodiment, sweep plate 401 is supported to a position proximate to a ground via a translation bracket 431. Translation bracket 431 couples, in this exemplary embodiment, to platform bracket 430 and sweep plate 401. Translation bracket is further supported, so as to secure the entire sweep plate suspension 402 assembly, by the underside of a skateboard truck 503, FIG. 5.

Figure 6:
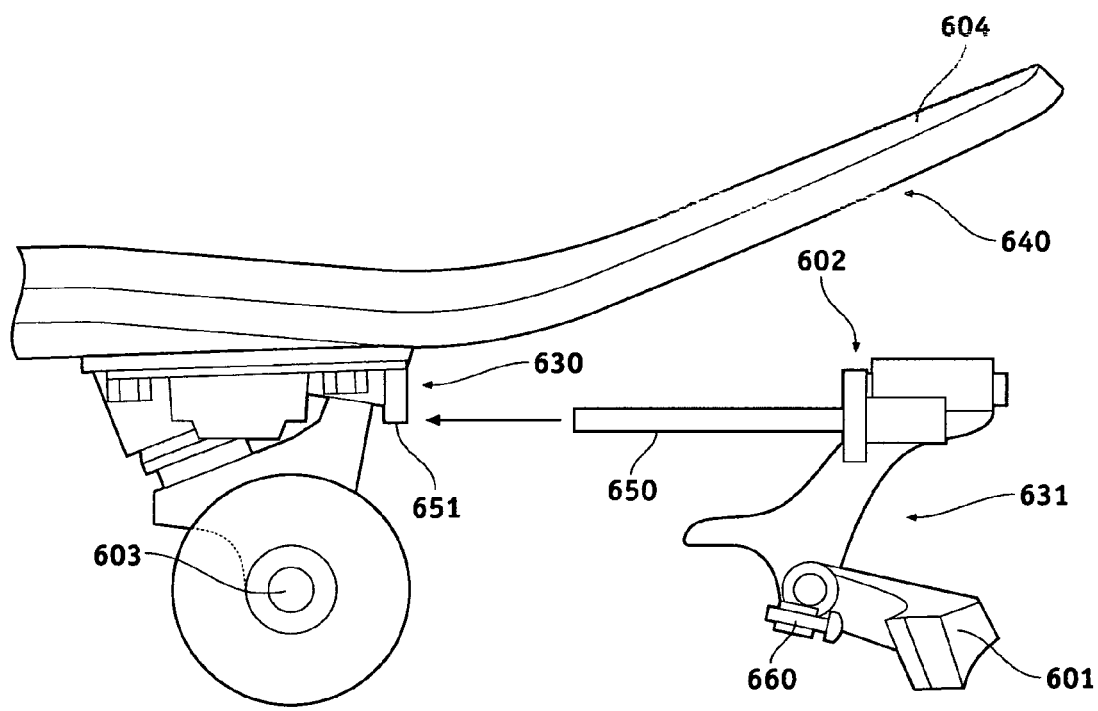
FIG. 6 representatively illustrates and exemplary embodiment of a deflector comprising yet another sweep plate suspension configuration that is removable.

In accordance with another exemplary embodiment of a deflector for a skateboard, those skilled in the art will understand that at times a user may wish to have a deflector that is easily releasable. For example, a user knowing that a place is free of any in-path debris and perhaps to reduce weight, may wish to have a deflector that is easily releasable. Turning now to FIG. 6, a releasable configuration is shown. Similar to the sweep plate suspension 402, sweep plate suspension 602 comprises a platform bracket 630 coupled to an underside 640 of a skateboard platform 604, and a translation bracket 631 couples to sweep plate 601. Here though, sweep plate suspension 602, further comprises a release pin 650 that may slideably engage with a release pin receiver 651, thereby facilitating easy removal of sweep plate 601, and in this case, translation bracket 631 as well. It will be appreciated by those skilled in the art that while translation bracket 431, shown in FIGS. 4 and 5, was further supported by the underside of skateboard truck 503, in this configuration translation bracket 631 is further supported by a topside of a skateboard truck 603. Those skilled in the art will understand that release pin 650 may be secured within release pin receiver 651 by any means now known or developed in the future, such as, pins, keys, friction fits, locks, etc. In this exemplary embodiment, sweep plate 601 is removable from sweep plate suspension 602, which is coupled to skateboard platform 604, but in other embodiments, a sweep plate configuration, such as the one shown and described by FIGS. 1 and 2 may also be configured to comprise a removable sweep plate element.

In accordance with various exemplary embodiments and with continued reference to FIG. 6, FIG. 6 further depicts a height adjustment mechanism, such as height adjustment screw 660. Height adjustment screw 660, in one example, may be turned, either clockwise or counter-clockwise to adjust and/or set a sweep plate height from a ground. Other exemplary embodiments shown and described herein may also comprise a similar height adjustment mechanism.

In accordance with various exemplary embodiments, those skilled in the art will understand that a deflector for a skateboard may be procured as an aftermarket item and coupled to an existing skateboard. However, various exemplary embodiments may comprise a skateboard platform comprising an integrated skateboard deflector, or independent skateboard trucks may comprise an integrated skateboard deflector, or an entire skateboard comprising both a skateboard platform and trucks may comprise an integrated skateboard deflector. Moreover, a user may wish to employ a skateboard comprising skateboard deflectors for both ends of a skateboard and they may be employed substantially as described and shown herein. In this manner, as a user performs tricks, stunts, etc., the user may find them with either end of the skateboard traveling in a direction that may benefit from a skateboard deflector. In other words, a skateboard deflector is only beneficial if the user is using the skateboard in the direction of the trucks comprising the skateboard deflector. If the skateboard is turned around and the rear trucks do not comprise a skateboard deflector, then the user suffers from the disadvantages described earlier. For example, in an exemplary embodiment comprising a skateboard comprising two sets of deflectors may comprise: a skateboard comprising a platform to support a user of the skateboard; a first set of wheel trucks coupled to a first end of the skateboard, and a second set of wheel trucks coupled to a second end of the skateboard. The skateboard may further comprise a first deflector to clear in-path debris of the skateboard during travel, wherein the first deflector couples to the first set of wheel trucks; and a second deflector to clear the in-path debris of the skateboard during travel, wherein the second deflector couples to the second set of wheel trucks. In the foregoing example, first and second deflectors may either one or both couple to a respective first and second platform end of the skateboard.

In accordance with various exemplary methods, a method to clear in-path debris for a traveling skateboard may comprise: providing a sweep plate to deflect the in-path debris from the skateboard's line of travel; providing a sweep plate suspension; coupling the sweep plate suspension to the skateboard; and coupling the sweep plate to the sweep plate suspension, wherein the sweep plate suspension provides to substantially maintain a sweep plate's position proximate to a ground in response to maneuverings of the skateboard. Among exemplary embodiments, providing the sweep plate may comprise providing the sweep plate to comprise a width that extends at least across a wheelbase of the skateboard. Further, providing the sweep plate suspension may comprise providing the spring plate suspension to comprise a spring to provide for a flexing of the sweep plate in response to the maneuverings, wherein exemplary springs may comprises at least one of a coil spring, torsion spring, leaf spring, compression spring, tension spring, a clock spring, and the like. Among various exemplary embodiments, coupling the sweep plate suspension to the skateboard may comprise coupling the sweep plate suspension to a truck of the skateboard, but in other embodiments coupling the sweep plate suspension to the skateboard may comprise coupling the sweep plate suspension to a platform of the skateboard. Among some exemplary embodiments, providing the sweep plate suspension may comprise providing the sweep plate suspension to comprise a release mechanism so that the sweep plate is releasable from the sweep plate suspension. Moreover, some exemplary methods may comprise providing an adjustment mechanism to set the sweep plate's position, and/or providing lights and/or other decorative elements to at least one of the sweep plate and the sweep plate suspension.

It will be appreciated by those skilled in the art that the methods described above are not limited solely in such disclosed regard, but rather may employ among the methods any and/or all of the various exemplary physical embodiments shown and described herein.

In the foregoing specification, a deflector for a skateboard has been described with reference to specific exemplary embodiments. Various modifications and changes may be made, however, without departing from the scope of the deflector for a skateboard as set forth in the following claims. The specification and Figs. are illustrative, rather than restrictive, and modifications are intended to be included within the scope of the deflector for a skateboard. Accordingly, the scope of the deflector for a skateboard should be determined by the appended claims and their legal equivalents rather than by merely the exemplary embodiments described.

For example, the steps recited in any method or process claims may be executed in any order and are not limited to the specific order presented in the claims. Additionally, the components and/or elements recited in any system claims may be assembled or otherwise operationally configured in a variety of permutations and are accordingly not limited to the specific configuration recited in the claims.

Benefits, other advantages and solutions to problems have been described above with regard to particular embodiments;

however, any benefit, advantage, solution to problem or any element that may cause any particular benefit, advantage or solution to occur or to become more pronounced are not to be construed as critical, required or essential features or components of any or all the claims.

As used herein, the terms "comprise", "comprises", "comprising", "having", "including", "includes" "is" or any variation thereof, are intended to reference a non-exclusive inclusion, such that a process, method, article, composition, system, or apparatus that comprises a list of elements does not include only those elements recited, but may also include other elements not expressly listed or inherent to such process, method, article, composition, system, or apparatus. Other combinations and/or modifications of the above-described structures, arrangements, applications, proportions, elements, materials or components used in the practice of the deflector for a skateboard, in addition to those not specifically recited, may be varied or otherwise particularly adapted to specific environments, manufacturing specifications, design parameters or other operating requirements without departing from the general principles of the same.

I claim:

1. A method for manufacturing a system to clear in-path debris for a traveling skateboard comprising:
    providing a sweep plate to deflect the in-path debris from the skateboard's line of travel;
    providing a sweep plate suspension;
    coupling the sweep plate suspension to the skateboard; and
    coupling the sweep plate to the sweep plate suspension, wherein the sweep plate suspension,
    comprising a sweep plate spring, provides to substantially maintain a sweep plate's position proximate to a ground in response to at least one of a pre-set height or a force from the ground upon the sweep elate so as to cause the sweep plate to flex.

2. The method of claim 1, wherein providing the sweep plate comprises providing the sweep plate comprising a width that extends at least across a wheelbase of the skateboard.

3. The method of 2, wherein the sweep plate spring comprises at least one of a coil spring, torsion spring, leaf spring, compression spring, tension spring, and a clock spring.

4. The method of claim 3, wherein coupling the sweep plate suspension to the skateboard comprises coupling the sweep plate suspension to a truck of the skateboard.

5. The method of claim 3, wherein coupling the sweep plate suspension to the skateboard comprises coupling the sweep plate suspension to a platform of the skateboard.

6. The method of claim 1, wherein providing the sweep plate suspension comprises providing a sweep plate suspension to comprise a sweep plate release mechanism so that the sweep plate is releasable from the sweep plate suspension.

7. The method of claim 1, further comprising providing an adjustment mechanism to set the sweep plate's ore-set height position.

8. A skateboard debris clearing system comprising:
    a skateboard platform;
    a first and second set of skateboard trucks, wherein the first set of skateboard trucks couples to an underside of the skateboard platform at a first end, and the second set of skateboard trucks couples to the underside of the skateboard platform at a second end;
    a sweep plate suspension comprising an upper truck mounting bracket and a lower truck mounting bracket, wherein the upper truck mounting bracket and the lower truck mounting bracket couple together about an axle portion of at least one of the first and second set of skateboard trucks;
    a beveled sweep plate and a sweep plate spring coupled to at least one of the upper and lower truck mounting brackets, wherein the beveled sweep plate, via the sweep plate spring, flexes to maintain a proximate position to a ground upon which the skateboard operates during at least a one wheel of the skateboard truck, which comprises the sweep plate suspension, beveled sweep plate, and sweep plate spring, is in contact with the ground.

9. The system of claim 8, wherein the sweep plate comprises a width that extends at least across a wheelbase of the skateboard.

10. The system of claim 8, wherein the sweep plate spring provides for a flexing of the sweep plate in response to a force between the ground and the sweep plate.

11. The system of 10, wherein the sweep plate spring comprises at least one of a coil spring, torsion spring, leaf spring, compression spring, tension spring, and a clock spring.

12. The system of claim 8, wherein the sweep plate is releasable from the sweep plate suspension.

13. The system of claim 8, wherein the sweep plate suspension comprises an adjustment mechanism to set a sweep plate's height position.

14. A deflector for a skateboard to clear in-path debris comprising:
    a sweep plate to deflect the in-path debris from a skateboard's line of travel, and the sweep plate comprises a leading edge set at a pre-set height such that the leading edge is proximate to a ground upon which the skateboard operates, and
    a sweep plate suspension coupled to the sweep plate and to at least one of, an underside of a skateboard platform and a first skateboard truck,
        wherein the sweep plate suspension further comprises a sweep plate spring configured to allow the sweep plate to flex in response to a force from the ground upon the sweep plate.

15. The deflector for a skateboard of claim 14, wherein the sweep plate comprises a width that extends at least across a wheelbase of the skateboard, and wherein the sweep plate comprises a beveled configuration.

16. The deflector for a skateboard of 15, wherein the sweep plate spring comprises at least one of a coil spring, torsion spring, leaf spring, compression spring, tension spring, and a clock spring.

17. The deflector for a skateboard of claim 14, wherein the sweep plate is releasable from the sweep plate suspension.

18. The deflector for a skateboard of claim 14, wherein the sweep plate suspension comprises an adjustment mechanism to set the sweep plate's pre-set height.

* * * * *